United States Patent
Zey et al.

(10) Patent No.: US 6,611,275 B1
(45) Date of Patent: Aug. 26, 2003

(54) METHOD OF AND APPARATUS FOR COMMUNICATING AND SCHEDULING CHANGE REQUESTS

(75) Inventors: David A. Zey, Faquay-Varina, NC (US); Michael L. Stokes, Clayton, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/386,944

(22) Filed: Aug. 31, 1999

(51) Int. Cl.⁷ .............................. G06F 3/00; G06F 17/60
(52) U.S. Cl. ...................... 345/752; 345/751; 345/963; 705/8
(58) Field of Search ................................ 345/700, 733, 345/739, 740, 744, 747, 751, 752, 753, 764, 780, 963; 705/8, 7, 9; 713/1, 100; 700/95, 99, 100, 101, 102

(56) References Cited

U.S. PATENT DOCUMENTS

| | | | |
|---|---|---|---|
| 5,216,612 A | * 6/1993 | Cornett et al. | 705/8 X |
| 5,522,066 A | * 5/1996 | Lu | 707/1 |
| 5,530,861 A | * 6/1996 | Diamant et al. | 705/8 |
| 5,566,339 A | * 10/1996 | Perholtz et al. | 713/340 |
| 5,884,306 A | * 3/1999 | Bliss et al. | 707/7 |
| 5,898,431 A | 4/1999 | Webster | 345/841 |
| 5,970,466 A | * 10/1999 | Detjen et al. | 705/8 |
| 6,018,343 A | 1/2000 | Wang et al. | 345/733 |
| 6,055,551 A | * 4/2000 | Heintein et al. | 345/753 X |
| 6,144,942 A | * 11/2000 | Ruckdashel | 705/8 X |
| 6,243,774 B1 | * 6/2001 | Eide et al. | 713/1 X |
| 6,349,238 B1 | * 2/2002 | Gabbita et al. | 700/101 |

OTHER PUBLICATIONS

Tanju Yurtsever et al, "Equipment management system (EMS)", Nov. 1995, IEEE, pp. 248–254.*
Doug Barney, "Scheduling tool gains remote capabilities", Mar. 20, 1995, InfoWorld, v17, n12, p43 (1).*
Tom Henderson et al, "Network delivery truck", Jan. 1996, LAN Magazine, v11, n1, p147 (4).*

* cited by examiner

Primary Examiner—Raymond J. Bayerl
Assistant Examiner—X. L. Bautista

(57) ABSTRACT

A method for communicating and scheduling maintenance requests, utilizing a program storage device readable by a server machine, which includes the steps of providing a maintenance request form having fields where information about a maintenance request can be set forth, e.g., fields identifying the maintenance requester and a proposed date when the maintenance will take place; providing maintenance request information to the server; storing the maintenance request information in a database; providing to a user a calendar having boxes corresponding to days of a month showing the maintenance request in a box corresponding to the maintenance requester's proposed date when the maintenance will take place, and showing status information associated with the maintenance request indicating whether the maintenance request has been approved, denied, or is pending approval; and providing an administrator interface with which an administrator can make changes to the status information associated with the maintenance request.

41 Claims, 14 Drawing Sheets

| FIG.7 |
| FIG.8 |
| FIG.9 |
| FIG.10 |

Change Request Form

Address http://

Change Window Request

Information about Requestor

Last name: ___34___   First name: ___36___   M.I.: ___38___

Phone: ___40___   E-mail: ___42___

Information about Request

Request Title: ___44___

Requesting Group: [Select One ▷] ←46
If other, please specify: _____

Maintenance Request Type: [Select One ▷] ←48
If other, please specify: _____

Proposed date of change: mm/dd/yy  *50*
Proposed time of change: ____  *52*
Estimated duration: ____  *54*

Nature of work:
[ scrollable text box ]  *56*

Group(s) impacted:  *58*
| TME Support | NTS | TPS | Infrastructure | Concord | Security |
| GVN | GCN | Courier | Dayton Hudson | MSSC | Other– |
| | | | | | |

If other, please specify:

FIG. 10

| Name | Phone | Pager | Outside Line |
|---|---|---|---|
| 1. | | | |
| 2. | | | |
| 3. | | | |
| 4. | | | |

↖ 66

After-action testing (Pass/Fail criteria): ↖ 68

Detail back-out procedure: ↖ 70

Submit Change — 72    Reset All Fields — 74

| Change Window Requests for June 1999 | | | | | | |
|---|---|---|---|---|---|---|
| Color key: | Yellow: Pending | Green: Approved | Black: Completed | Blue: Rescheduled | Red: Emergency | |
| Sunday | Monday | Tuesday | Wednesday | Thursday | Friday | Saturday |
| | | 1 | 2 | 3 | 4 | 5 |
| 6 | 7<br>CAY199906001<br>CAY199906002 | 8 | 9 | 10 | 11 | 12 |
| 13 | 14 | 15 | 16 | 17 | 18 | 19 |
| 20 | 21<br>CAY199906007 | 22 | 23 | 24 | 25 | 26 |
| 27 | 28 | 29 | 30 | | | |

Click here to submit a new change window request

Select a month to view ▷

FIG. 11

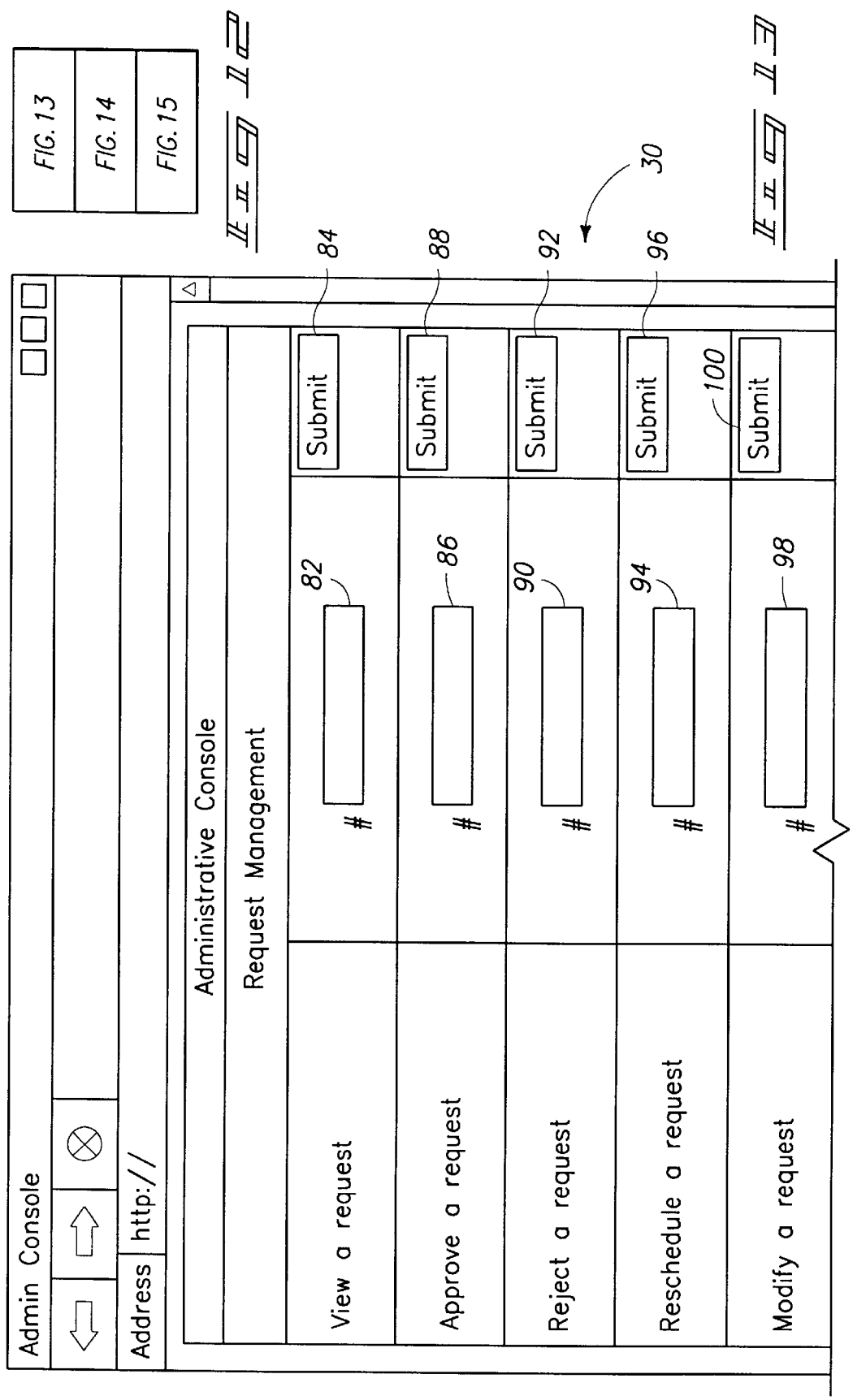

| Groups | | |
|---|---|---|
| Select One ▷ | Select One ▷ | Locations Select One ▷ |
| Go | Go | Go |
| View requests by group | View requests by type | View requests by location |

FIG. 18B

| Request# | Scheduled Date | Request Type | Request Title | Status |
|---|---|---|---|---|
| CAY199905015 | 5/17/99 | Infrastructure | IDN Connection to ANS | Completed |
| CAY199905016 | 5/17/99 | System | Performance Toolbox | Completed |
| CAY199905005 | 5/27/99 | Hardware | Move ops to gnm6-nv2 for maint | Completed |
| CAY199906001 | 6/07/99 | Emergency | MSSC ADM1 Maintenance | Completed |
| CAY199906002 | 6/07/99 | Informational | Change Event log size in domain 4 and 5 | Completed |
| CAY199906007 | 6/21/99 | Emergency | Backup and database maintenance of DHCO servers | Completed |
| | | | Total number of requests in report | 6 |
| CAY | | | | |

Sort by: Date ⦿  Request Type ○

Filter by: Pending ○  Completed ⦿  Rejected ○ submit

FIG. 19

METHOD OF AND APPARATUS FOR COMMUNICATING AND SCHEDULING CHANGE REQUESTS

TECHNICAL FIELD

The invention relates to change management. The invention also relates to methods of and apparatus for requesting and communicating requests for computer system maintenance or change.

BACKGROUND OF THE INVENTION

Maintenance of computer systems is known as change management. With current change management, requests for changes and other communications can be quite cumbersome and different from one division of an organization to another. In many large organizations, communications of requests and communications of the status of those requests typically take place by e-mail.

Some organizations may have a web page for request submittals, but after the request is submitted, subsequent communications typically take place by e-mail. Such subsequent communications may involve, for example, approvals, denials, cancellations, status requests, scheduling, and re-scheduling.

Because of this lack of structure, requested maintenance is sometimes performed even though appropriate approvals have not been granted. Alternatively, the maintenance may not occur because the appropriate approvals have not been received by the requester. Proper communication is important, but difficult in a large organization.

Using calendars to organize information in a computer network environment is known in the art. See, for example, U.S. Pat. No. 5,898,431 to Webster et al. (incorporated by reference).

SUMMARY OF THE INVENTION

The invention provides a method of communicating and scheduling maintenance requests and an apparatus defined by the method. A maintenance requester is provided a maintenance request form having various fields. The maintenance requester can provide information about a maintenance request with the fields which include, for example, a field with which the maintenance requester can provide identifying information, and a field with which the maintenance requester can provide a proposed date when maintenance will take place. Maintenance request information that the maintenance requester provided using the maintenance request form is received and stored in a database. A user is provided a calendar having boxes corresponding to days of a month, showing the maintenance request in a box corresponding to the maintenance requester's proposed date when the maintenance will take place, and showing status information associated with the maintenance request indicating whether the maintenance request has been approved, denied, or is pending an approval decision.

In one aspect of the invention, an administrator interface is provided to the maintenance administrator with which the administrator can make changes to the status information associated with the maintenance request. In another aspect of the invention, changed status information is indicated with a change of color.

In one aspect of the invention, a schedule number is assigned to the maintenance requester information and the maintenance requester information is associated with the schedule number.

In another aspect of the invention, the fields include a field with which the maintenance request can indicate who will be impacted by the computer system maintenance, and the change request information is transmitted to whoever was indicated as being impacted by the maintenance.

Other features and advantages of the invention will become apparent from the following claims and detailed description, reference being made to the figures.

BRIEF DESCRIPTION OF THE DRAWINGS

FIG. 6 is a map illustrating how FIGS. 7–10 are to be assembled.

FIGS. 7, 8, 9, and 10, when assembled in the manner shown in FIG. 6, illustrate the change request form of FIG. 2.

FIG. 12 is a map illustrating how FIGS. 13–15 are to be assembled.

FIGS. 13, 14, and 15, when assembled in the manner shown in FIG. 12, illustrate the administrator interface of FIG. 4.

FIG. 16 is a map illustrating how FIGS. 17–18 are to be assembled.

FIGS. 17 and 18, when assembled in the manner shown in FIG. 16, illustrate the user console interface of FIG. 5.

FIG. 19 illustrates a sample report generated by the system responsive to a request made using the administrator interface of FIGS. 13–15 or the user console interface of FIGS. 17–18.

DETAILED DESCRIPTION OF THE PREFERRED EMBODIMENTS

Figure 1:
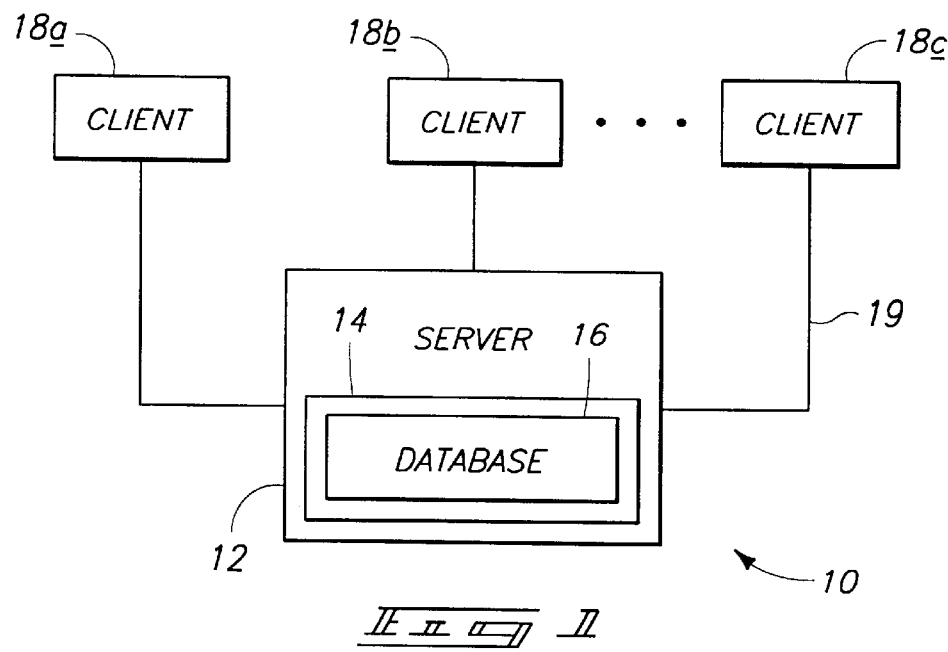
FIG. 1 is a block diagram illustrating a system in accordance with one aspect of the invention.

FIG. 1 illustrates a system 10 embodying one aspect of the invention. The system 10 comprises a server 12, which can be a minicomputer, a microcomputer, a mainframe computer, a personal computer (PC) such as a personal computer of the type having an Intel (™) processor or clones thereof, Apple (™), Macintosh (™), or PowerPC (™) personal computer or clones thereof, or any other appropriate device or system for performing the server functions described below. In one embodiment, the server 12 includes memory 14, and other typical components (not shown) such as a processor, input devices (e.g.; keyboard and mouse), output devices (e.g.; monitor and printer), ROM, RAM, serial ports, parallel ports, communication hardware, which may either be internal or external, such as internal communication cards (e.g., modem card or network card) or external communication hardware (e.g., external modem), etc. In the illustrated embodiment, the server 12 runs a network operating system. More particularly, in the illustrated embodiment, the server 12 has a multi-user, multi-tasking operating system such as UNIX, LINUX (e.g., if the server is a personal computer), etc.

The server has a database 16 defined in the memory 14. In the illustrated embodiment, such memory comprises a hard disk drive having information arranged thereon to define the database, but the memory could alternatively be defined, at least in part, by one or more of the following: CD-ROMs, random access memory (RAM), read only memory (ROM), optical storage, floptical storage, tape storage, or any other appropriate data storage medium.

The system 10 further comprises (see FIG. 1) a plurality of client machines 18a, 18b, 18c, etc. Any of the client machines 18a, 18b, 18c, etc. can be used by a user to access a change request form (e.g., a maintenance request form). Such a user is hereinafter referred to as a requestor. Any of the client machines 18a, 18b, 18c, etc. can also be used by a user to access a calendar showing scheduled change requests (e.g., maintenance requests), by a user to access a user console to run reports, or by a change manager (also referred to herein as an administrator) to access an administrator console (also referred to herein as an administrator interface). The administrator is a person who is granted rights to change status information associated with the change requests, e.g., to approve, deny, or reschedule requests. These actions are performed using an administrator console screen, as will be described in greater detail below. A client machine only provides an administrator console when the operator of the client machine supplies a user name and password authenticating the user as an administrator. In one embodiment, any user or administrator can view all change requests, regardless of who made the request, using any of the client machines 18a, 18b, 18c, etc.

The clients comprise terminals, such as Web-TV (™) or iMac (™) terminals, computers such as minicomputers, microcomputers, mainframe computers, personal computers such as personal computer including an Intel (™) processor or clones thereof or Apple (™), Macintosh (™), or PowerPC (™) personal computers or clones thereof, or any other appropriate computers or terminals. The client 18a may be a different computer than the client 18b, which in turn may be different from the client 18c, etc. The clients 18a, 18b, 18c, etc. include typical components (not shown) such as processors, input devices (e.g.; keyboard and mouse), output devices (e.g.; monitor and printer), RAM, ROM, memory (hard drive, disk drive, tape unit, CD-ROM, etc.), serial ports parallel ports, communication hardware, which may either be internal or external, such as internal communication cards (e.g., modem card or network card) or external communication hardware (e.g., external modem), etc.

The clients communicate with the server by a communications network 19. In the illustrated embodiment, the clients communicate with the server via the Internet. In an alternative embodiment, the clients communicate with the server via an Intranet. Other communication networks may be employed. Any appropriate communications hardware can be employed, such as telephone modems, DSL connections, ISDN connections, cable modems, satellite modems, etc., in any combination. When in operation, the clients 18a, 18b, 18c, etc. respectively run web browsers such as Netscape (™), WebTV (™), Internet Explorer (™), or any other appropriate web browser. In one embodiment, the change request form is a web page form, the administrator console is a web page form, and the calendar is a web page.

The server 12, in operation, executes a program of instructions (e.g., computer program code) for performing various functions described below. The program of instructions is tangibly embodied in a program storage device which, in the illustrated embodiment, is defined by the memory 14. The program of instructions, in one embodiment, is transmitted over a communications network (e.g., the Internet, a phone line using modems, a satellite communications network, etc.) for sale or distribution.

The program code can be written in any appropriate programming language. In the illustrated embodiment, the program code comprises HTML (hypertext markup language) code including a Java applet. In an alternative embodiment, the program code comprises HTML code including HTML forms and PERL scripts. Other embodiments are possible.

Figure 2:
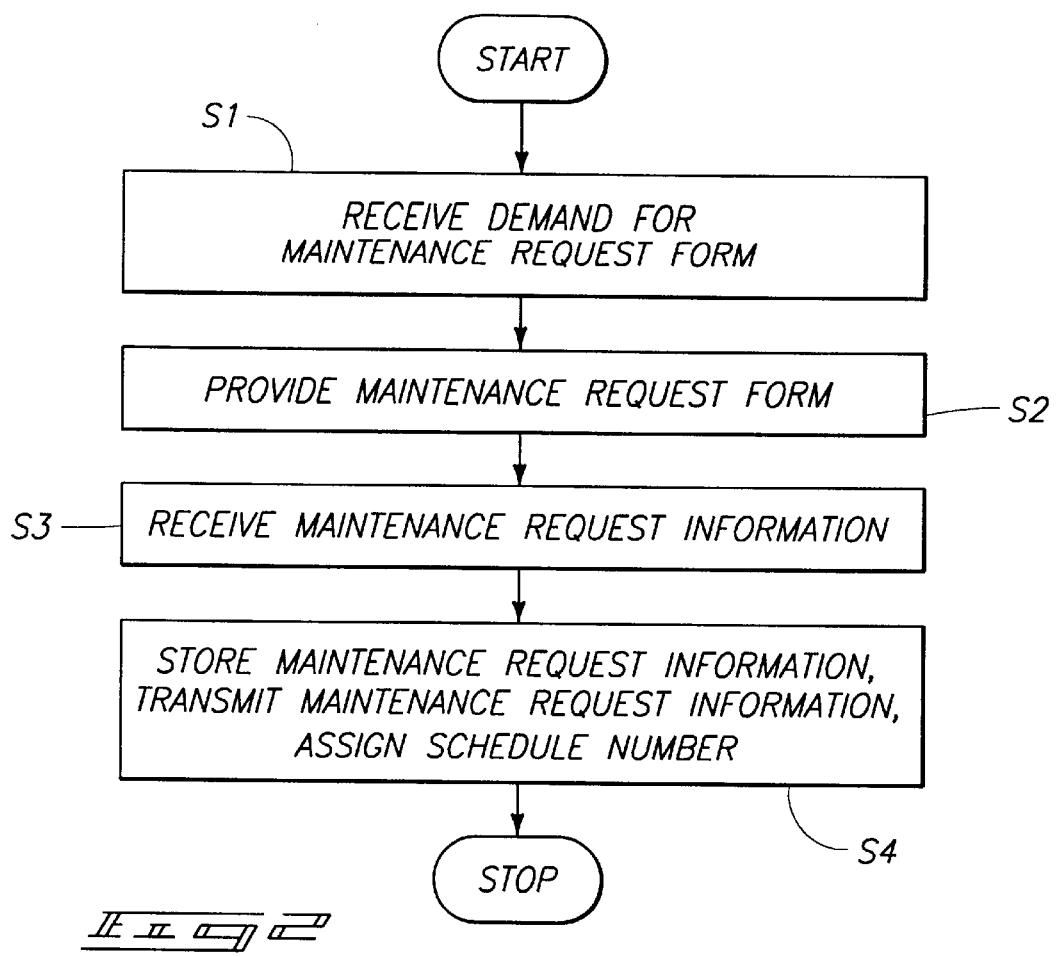
FIG. 2 is a flowchart illustrating providing a change request form, and receiving and storing a maintenance request, using the system of FIG. 1.

FIG. 2 illustrates how the program of instructions is coded, in accordance with one aspect of the invention, for receiving and storing a maintenance request.

In operation, at a step S1, the server running the instructions receives from a maintenance requester's client machine a demand for a maintenance request form. This can be, for example, by pressing a button 26 (see FIG. 11) on a web page including a change maintenance calendar 22 or by pointing a browser to a particular URL using a client machine. After performing step S1, the server proceeds to step S2.

At a step S2, the server provides to a maintenance requester's client machine a maintenance request form 20 (see FIGS. 7–10) having a variety of fields. The fields include, for example, those with which a maintenance requester can provide information about a maintenance request, identify the maintenance requester, and provide a proposed date when maintenance will take place. In the particular embodiment shown in FIGS. 7–10, the fields include a field 34 with which the requester can indicate his/her last name, a field 36 with which the requester can indicate his/her first name, a field 38 with which the requester can indicate his/her middle initial, a field 40 with which the requester can indicate his/her phone number, a field 42 with which the requester can indicate his/her e-mail address, a field 44 with which the requester can indicate a title for the maintenance request, a field 46 with which the requester can indicate a name of a group requesting the maintenance, a field 48 with which the requester can indicate the maintenance request type (e.g., emergency, non-emergency, software, hardware, etc.), a field 50 with which the requester can indicate the proposed date of the maintenance, a field 52 with which the requester can indicate the proposed time of the maintenance, a field 54 with which the requester can indicate the estimated duration of the maintenance, a field 56 with which the requester can indicate the nature of the work, a field 58 with which the requester can indicate the group or groups impacted, a field 60 with which the requester can indicate the impact to the system or groups if the maintenance is performed, a field 62 with which the requester can indicate the impact if the maintenance is not performed, a field 64 with which the requester can indicate what premaintenance activities are required (if any), fields 66 with which the requester can indicate the name, phone number, pager number, and outside line of each support participant (e.g., the people who would perform the maintenance), a field 68 with which the requester can indicate what testing is required after the maintenance (e.g., pass/fail criteria), and a field 70 with which the requestor can indicate a back-out procedure.

If the requester submits a request indicated as being of a certain type, such as an emergency request type, with field 48, additional action is taken. For example, when an emergency request type is submitted the server sends a text page via pager and an e-mail to the change manager (the maintenance administrator) indicating the request type "EMERGENCY REQUEST," the request schedule number and the requester's name and phone number.

The fields can be in the form of text boxes, radio buttons, pull down menus, or any other appropriate type used in HTML forms. Different or additional fields are employed in alternative embodiments. The form 20 further includes a button 72 for submitting the change request information, and a button 74 for clearing the form. After performing step S2, the server proceeds to step S3.

At a step S3, the server receives maintenance request information that the maintenance requester provided using the request form in step S2. More particularly, instead of receiving the entire form, only information or codes indicating selections or entries made using pull down menus, radio buttons, text boxes, or other formats is received, in the illustrated embodiment, for step S3. After performing step S3, the server proceeds to step S4.

At step S4, the server, in any order, stores the maintenance request information in the database 16, and transmits (e.g., sends an e-mail including the information) the maintenance request information to the maintenance administrator's client machine. More particularly, the maintenance request information is automatically sent to a predetermined list of e-mail addresses.

Figure 11:
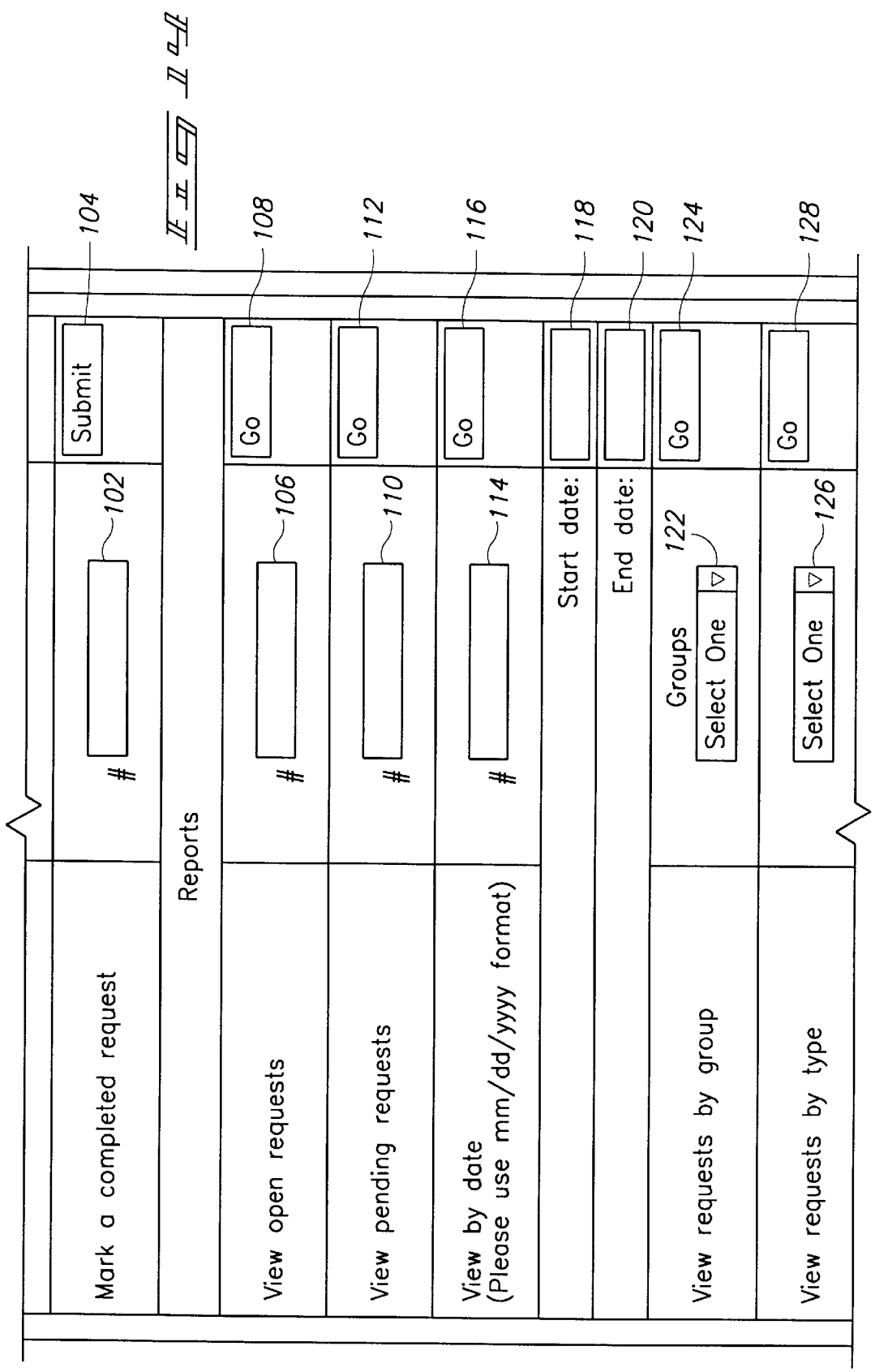
FIG. 11 illustrates the calendar display of FIG. 3.
Figure 15:
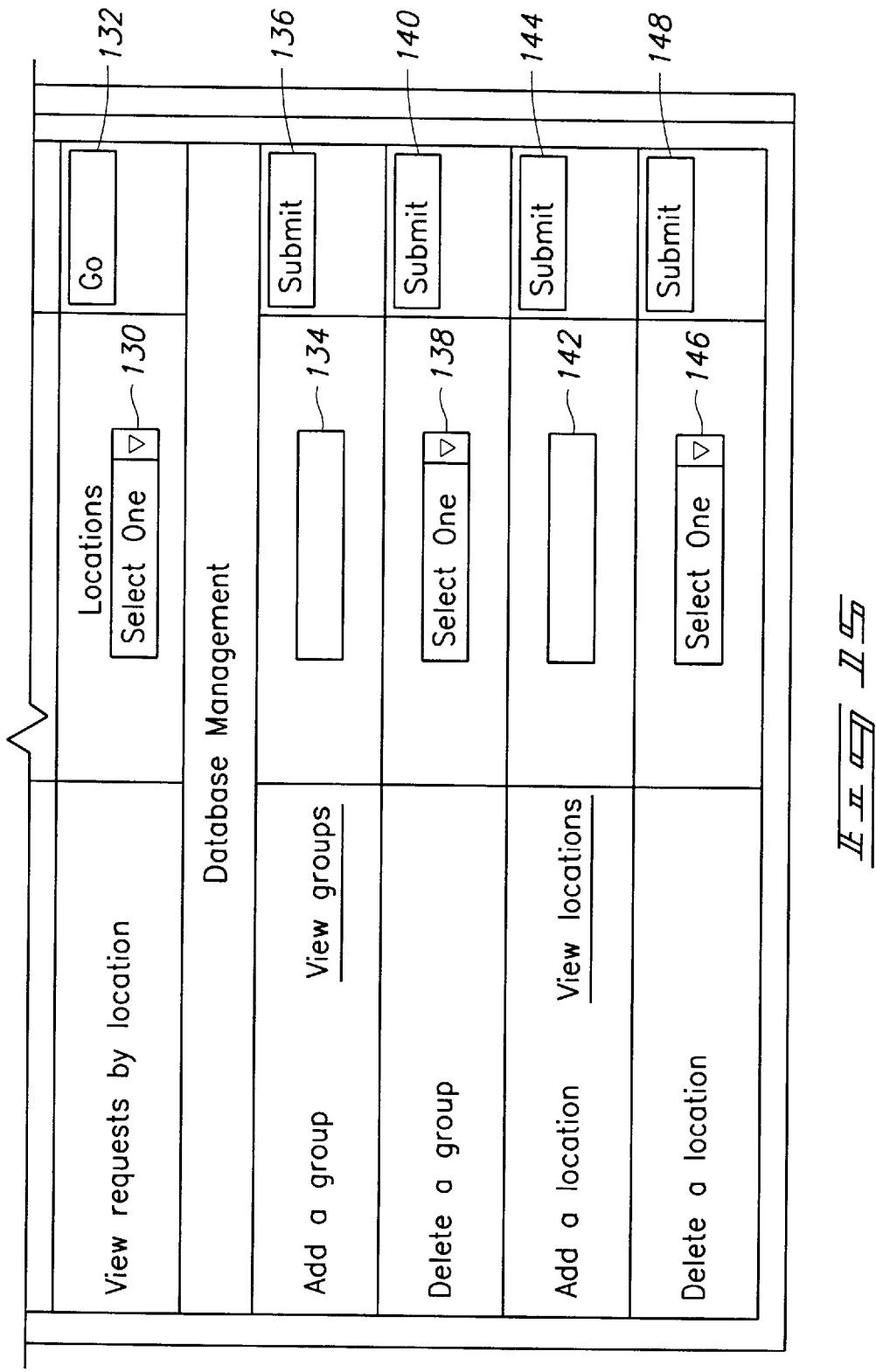
Figures 16, 17:
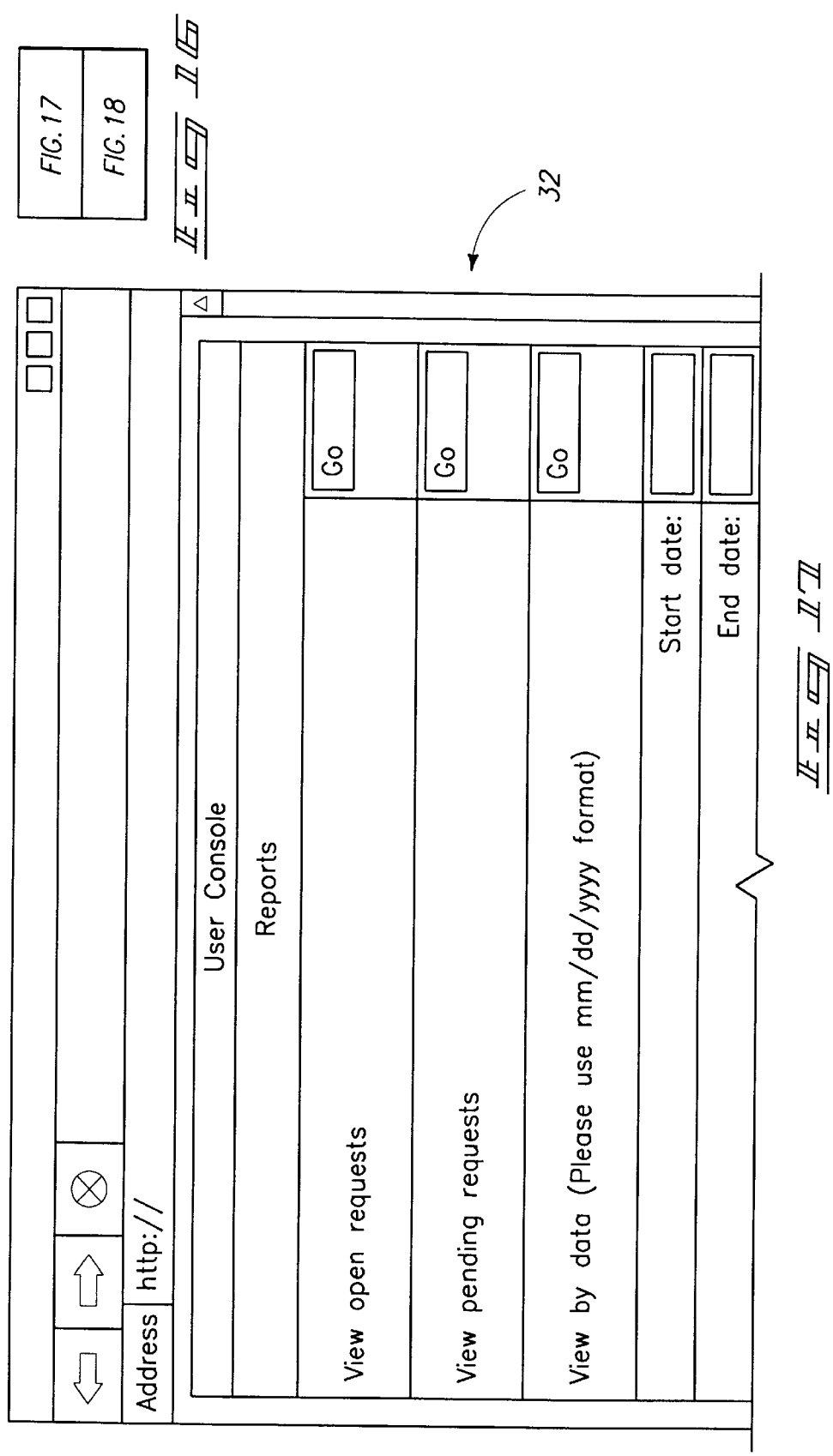

The server also assigns a schedule number 28 to the maintenance request information as shown in FIG. 11. The schedule number 28 then becomes available for display on the calendar 22 on the day as specified by the requester within the request form 20. In one embodiment, the schedule number 28 is in a predetermined format. For example, in one embodiment, in a format including three letters identifying a site name, four numbers for the year, two numbers for the month and three numbers indicating the number sequence for the month. An example of a schedule number 28 for the request generated in accordance with this type of format is CAY199906001. The maintenance request information within the database 16 can be retrieved by the calendar 22, by an administrator console or interface 30 (FIGS. 13–15), and by a user console 32 (FIGS. 17–18), e.g., using the schedule number. After performing step S4, the server proceeds to an idle state.

Figure 3:
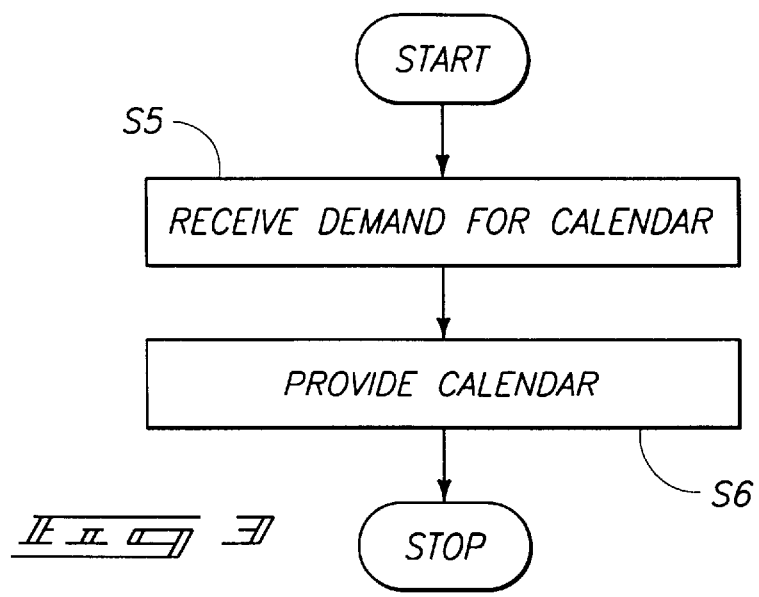
FIG. 3 is a flowchart illustrating receiving and processing a request for a calendar display using the system of FIG. 1.

FIG. 3 illustrates how the program of instructions is coded, in accordance with one aspect of the invention, for receiving and processing a request for a calendar display.

At a step S5, the server running the instructions receives from a user's client machine 18a, 18b, 18c, etc. a demand for a calendar. This can be, for example, by pressing a button or link on a web page or by pointing a browser to a particular URL using a client machine. This can be the same client machine used with the request form in FIG. 2, or a different client machine. After performing step S5, the server proceeds to step S6.

At a step S6, the server provides to a user's client machine a calendar 22 (see FIG. 11), which is described below in greater detail. The change maintenance calendar 22 is, in appearance, a typical calendar with boxes 24 for each day of the current month (or a selected month). The term "box", as used herein, doesn't necessarily refer to a rectangular geometric shape, but instead refers to an area on the calendar corresponding to a day of the month.

The screen that includes the calendar 22 includes the button 26 which, when selected, brings up a change request form 20 to be completed by the requester. The calendar 22 also includes days of the week indicia 76. The screen that includes the calendar 22 includes a text box 78 in which a request number can be entered, and a button 80 for bringing up details associated with the request number entered in the text box 78 from the database 16.

The calendar 22 shows the schedule number 28 associated with the maintenance request in a box 24 corresponding to the maintenance requester's proposed date when the maintenance will take place. If there have been other maintenance requests, those too will be displayed on the calendar.

The calendar 22 also shows status information associated with the maintenance request indicating whether the maintenance request has been approved, denied, or is pending an approval decision. An area or field on the screen including the calendar 22 includes non-alphanumeric indicia to indicate the status of the request. In the illustrated embodiment, the status information is indicated using color on the calendar 22.

For example, in one embodiment, the schedule number is initially a predetermined color (e.g., the schedule number is highlighted with a predetermined color, or the text of the schedule number is a predetermined color), such as yellow, to indicate a request has been submitted and is awaiting action by the change manager.

In the illustrated embodiment, when an emergency request is submitted it will initially be red on the calendar 22, which indicates it is a emergency request and is awaiting action by the change manager.

When the change manager provides a change of status for a change request, such as an approval, via the administrator console 30, nonalphanumeric indicia in an area or field on the calendar 22 changes to indicate a change in the status of the request. For example, in the illustrated embodiment, the schedule number will be a color that changes to green which indicates the request has been approved. Alternatively, when the change manager provides a rejection via the administrator console 30 for a change request, the request schedule number disappears from the calendar 22 but still resides within the database and is accessible to the change manager via the administrator console 30. From the administrator console 30, the change manager can reschedule the rejected request and it will reappear on the calendar 22 on the day selected by the change manager with indicia indicating the change request was rescheduled (e.g., by showing the schedule number with the rescheduled color of blue).

If the change manager reschedules a request via the administrator console 30, the rescheduled request will move to the new day selected by the change manager. In the illustrated embodiment, the schedule number of the rescheduled request will appear with the color of blue on the calendar 22 indicating that it is a rescheduled request and is awaiting a next action by the change manager such as an approval.

In one embodiment, the calendar 22 has a legend area or box 150 explaining the meanings of status.indicia (e.g., color representations). In the illustrated embodiment, the legends describing an association between a color and a status are shown on the calendar 22 in the respective colors. For example, the text "Yellow: Pending" shown on the calendar 22 is displayed in yellow, the text "Green: Approved" is displayed in green, the text "Black: Completed" is displayed in black, the text "Blue: Rescheduled" is displayed in blue, and the text "Red: Emergency" is displayed in red. Other associations between colors and status can be employed.

In one embodiment, users accessing the calendar 22 have the ability to click on a dropdown box (not shown) which lists all change request schedule numbers on the calendar 22 for the entire month.

In the illustrated embodiment, the user may select a specific schedule number (by clicking on a schedule number entry shown on the calendar 22 or from the drop-down box described above) and view the entire request. More particularly, in the illustrated embodiment, the schedule number entries are hyperlinks.

When positioning a mouse pointer over an entry shown on the calendar 22, in one embodiment, the request title associated with the schedule request is displayed, such as in a window adjacent the mouse pointer (e.g., in a manner similar to a quick tip) or elsewhere in the browser window.

The month displayed is the present month, as indicated by the system date of the server. In the illustrated embodiment, users have the ability to select previous or subsequent months to view as long as the months contain active request information, using a pull down menu 152 (while administrators can select previous of subsequent months having any request information). In an alternative embodiment, users have the ability to view any month having any request information in the database. When viewing another month, the user also has the ability to view the actual request as mentioned above. In one embodiment, requesters have the ability to submit requests in advance for the next month and have the ability to view the same.

In one embodiment, old stored schedule numbers are viewable and the associated requests are retrievable via the calendar 22 as well as via the administrator console 30 and user console 32 for some amount of time (e.g., for the previous twelve months) after which point the request will be archived.

After performing step S6, the server proceeds to an idle state.

Figure 4:
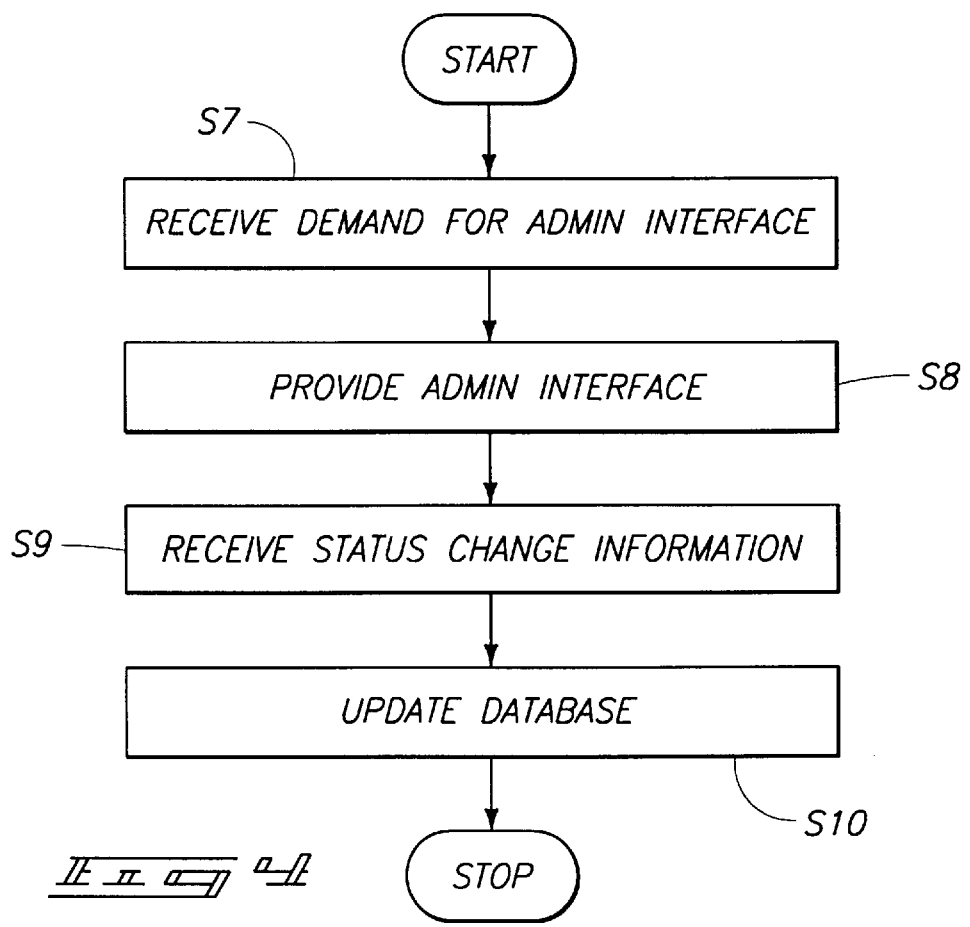
FIG. 4 is a flowchart illustrating receiving and processing a request for an administrator interface using the system of FIG. 1.

FIG. 4 illustrates how the program of instructions is coded, in accordance with one aspect of the invention, for receiving and processing a request for an administrator console 30.

At a step S7, the server running the instructions receives from an administrator's client machine a demand for an administrator console or interface 30. This can be, for example, by pressing a button or link on a web page or by pointing a browser to a particular URL using a client machine. This can be the same client machine used with the request form of FIG. 2, the calendar 22 of FIG. 3, or a different client machine. The user of the client machine, in the illustrated embodiment, is authenticated as being an administrator using a user name and password scheme. In one embodiment, there are more than one users who are administrators. After performing step S7, the server proceeds to step S8.

At step S8, the server provides to an administrator's client machine an administrator or administrative console 30 (FIGS. 13–15) with which the change manager or administrator can make changes to the status information for a selected maintenance request. The administrator console 30 is used by the change manager to provide approvals, denials, rejections, rescheduling or indicating completion of a submitted change request appearing within the calendar 22. The administrator console 30 includes fields for the schedule number of the request for which the change manager wishes to take action (e.g., change status).

Using the administrator console 30, the change manager has the ability to change the status of requests. In the illustrated embodiment, the change manager has the ability to perform the following request management functions using the administrator console 30: view a request associated with a schedule number by entering the schedule number in text box 82 and pressing button 84, provide an approval using text box 86 and button 88, reject a request using text box 90 and button 92, reschedule a request using text box 94 and button 96, modify a request using text box 98 and button 100, or mark a request as completed using text box 102 and button 104. Other or different fields are employed in alternative embodiments.

Here, as with all the forms described herein, alternative interface formats can be employed. For example, instead of multiple buttons, there can be a single button. Instead of multiple text boxes, there can be a single text box for entering a schedule number and a pull down menu or radio buttons for indicating the type of request management function that is desired.

In one embodiment, the administrator console 30 further includes a text box for informational messages or comments to be sent to the requester by the change manager when providing approvals or rejections.

When the change manager (administrator) provides a denial or rejection via the administrator console 30 for a change request, an e-mail message is auto-generated to the requester, using the requester's submitted e-mail address, advising that approval for the request has been either denied or rejected. The reason for denial information as provided by the change manager within the text box of the administrator console 30 (in embodiments where such a text box is used) will be included within the e-mail.

When the change manager provides an approval via the administrator console 30 for a change request, an e-mail message is auto-generated to the requester via the submitted requester's e-mail address advising that approval for the request has been granted.

The change manager also has the ability to compile reports via the administrator console 30. By selecting a date range in conjunction with other variables, the change manager can create custom reports on maintenance activities. Various options are available to the change manager for creating custom reports. For example, in the illustrated embodiment, reports can be pulled (generated) to view or show open requests, using text box 106 and button 108, to view pending requests, using text box 110 and button 112, to view by date (start date and end date to define date range), using text box 114 and button 116 and text boxes 118 and 120 for the start date and the end date, to view requests by group (individual or all groups), using pull down menu 122 and button 124, to view requests by type (individual or all types), using pull down menu 126 and button 128, or to view requests by location (individual or all locations), using pull down menu 130 and button 132.

In one embodiment, the change manager is able to perform various database functions from the administrator console 30 which allow information to be added or deleted to specified fields. Such database functions available from the administrator console 30 include: add a group, using text box 134 and button 136, delete a group, using text box 138 and button 140, add a location, using text box 142 and button 144, and delete a location, using text box 146 and button 148. Other or different functions are available in alternative embodiments. In one embodiment, functions available further include add a pager pin number (e.g., for an emergency request), delete a pager pin number, and add an e-mail address (which, in one embodiment, causes any previously entered e-mail address to be overwritten). After performing step S8, the server proceeds to step S9.

At step S9, the server receives the status change information. After performing step S9, the server proceeds to step S10.

At step S10, the server updates the database with the status change information. After performing step S10, the server proceeds to an idle state.

Figure 5:
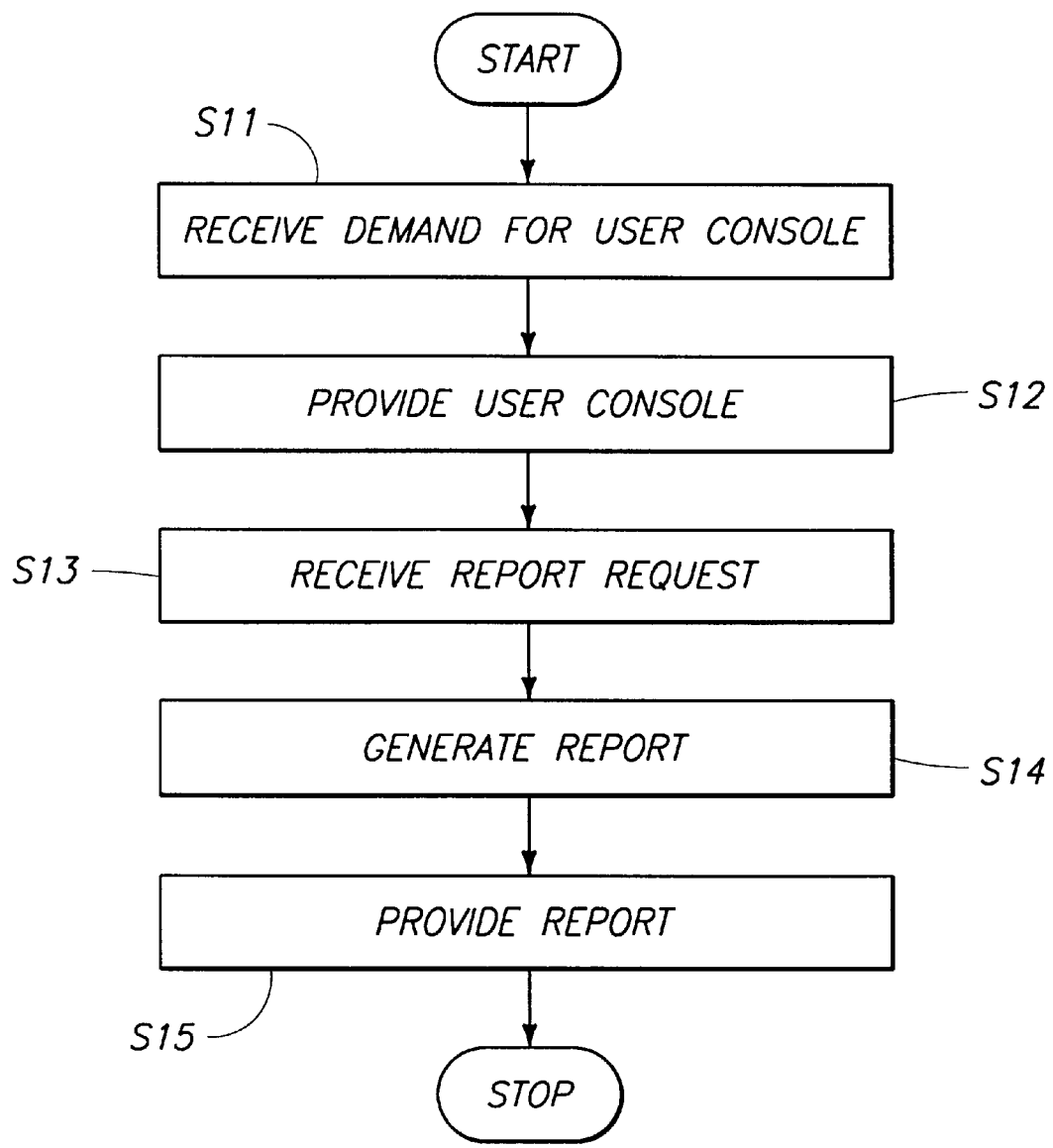
FIG. 5 is a flowchart illustrating receiving and processing a request for a user console interface from which reports can be generated using the system of FIG. 1.
Figure 9:
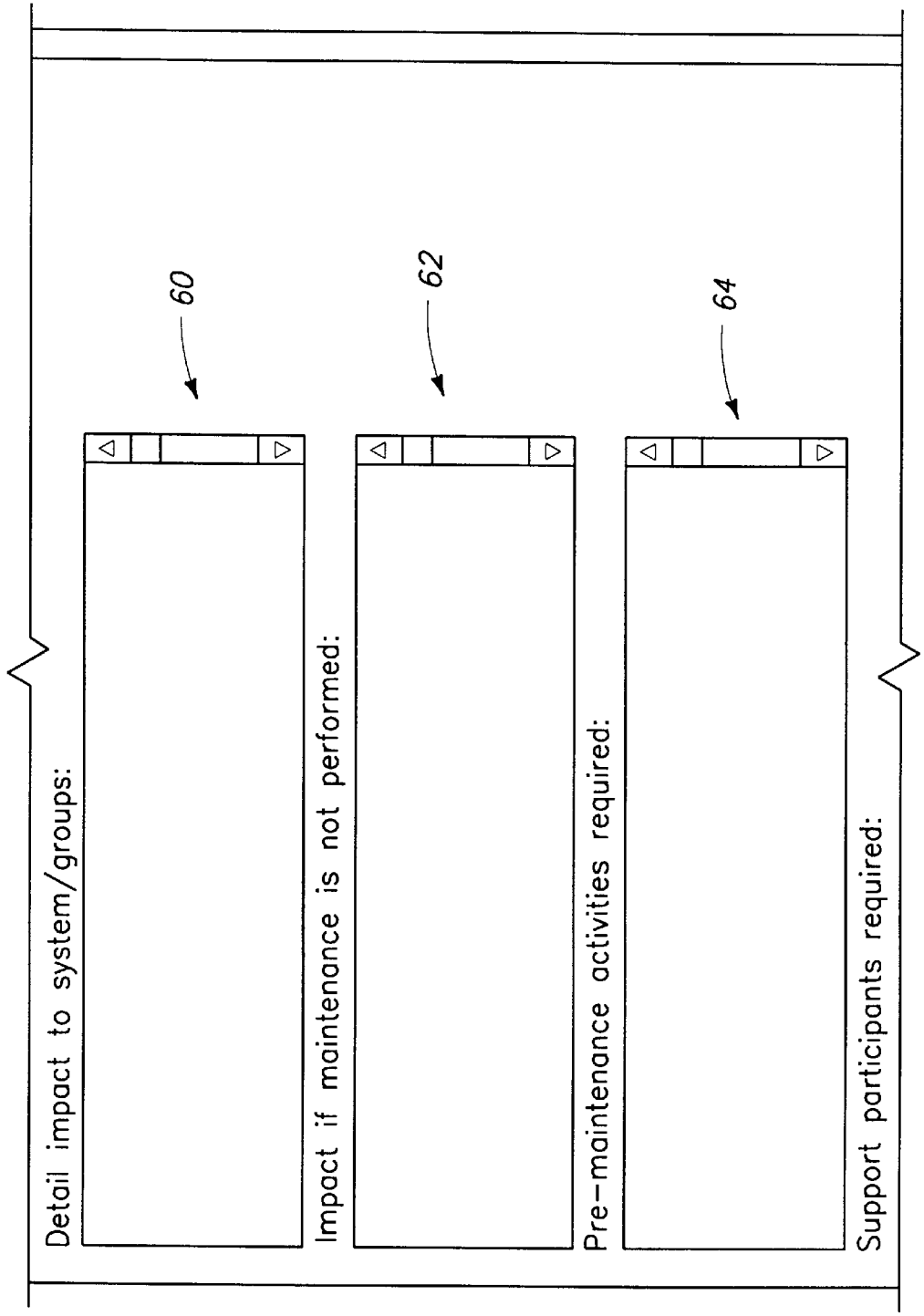

FIG. 5 illustrates how the program of instructions is coded, in accordance with one aspect of the invention, for receiving and processing a request for a user console or interface from which reports can be generated. The user console is a tool accessible by the user specifically developed for reporting purposes. This provides the same functionality as the "reports" function of the administrator console.

At a step S11, the server running the instructions receives from a user's client machine a demand for a user console. This can be, for example, by pressing a button or link on a web page or by pointing a browser to a particular URL using a client machine. This can be the same client machine used with the request form of FIG. 2, the calendar 22 of FIG. 3, the administrator console 30 of FIG. 4, or a different client machine. After performing step S11, the server proceeds to step S12.

At step S12, the server provides to the user's client machine a user console with which the user can request reports relating to maintenance requests.

For example, by selecting a date range in conjunction with other variables, the user can create custom reports on maintenance activities. Various options are available to the user for creating custom reports. For example, in the illustrated embodiment, reports can be pulled (generated) to view or show open requests, to view pending requests, to view by date (start date and end date to define date range), to view requests by group (individual or all groups), to view requests by type (individual or all types), or to view requests by location (individual or all locations). After performing step S12, the server proceeds to step S13.

At step S13, the server receives a report request. After performing step S13, the server proceeds to step S14.

At step S14, the server accesses the database, and generates the report requested. After performing step S14, the server proceeds step S15.

At step S15, the server provides the report to the client machine of the user who requested the report. A sample report is shown in FIG. 19.

The report includes schedule numbers 154, which are hyperlinked in the illustrated embodiment as they are in the calendar 22. The report also includes scheduled dates 156, request types 158, request titles 160, and status 162 for the respective schedule numbers 154. In the illustrated embodiment, the report is a web page. The web page report also includes, in the illustrated embodiment, radio buttons or other selectors 164 for sorting (reordering) the displayed information (schedule numbers and associated dates, request types, request titles, and status) by date or request type. The report also includes, in the illustrated embodiment, radio buttons or other selectors 166 for filtering (reducing the amount information displayed) by status (e.g., pending, rejected, or completed), and also includes a submit button 168 for effecting the sorting and/or filtering based on the selected radio buttons. After performing step S15, the server proceeds to an idle state.

In the illustrated embodiment, the server runs a multi-user, multitasking operating system. Accordingly, the processes of FIGS. 2–5 can occur in any order, simultaneously or in any combination, or multiple instances of one or more of the processes of FIGS. 2–5 can be running at the same time (e.g. if multiple users and/or administrators are accessing the server at the same time).

The protection sought is not to be limited to the disclosed embodiments, which are given by way of example only, but instead is to be limited only by the scope of the appended claims as properly interpreted in accordance with the doctrine of equivalents.

What is claimed is:

1. A method of communicating and scheduling requests for computer system maintenance, the method comprising:

providing to a change requester a change request form having fields with which the change requester can provide information indicating contact information for the change requester, a proposed date when the computer system maintenance will take place, and who will be impacted by the computer system maintenance;

receiving change request information from the change requester in response to the change requester providing information for at least some of the fields of the change request form;

storing the change request information in a database, transmitting the change request information to a change administrator, and transmitting the change request information to whoever was indicated as being impacted by the maintenance; and providing to a user a calendar displaying indicia associated with the change request information, as well as status information associated with the change request information.

2. A method of communicating and scheduling requests for computer system maintenance in accordance with claim 1 wherein the fields of the change request form comprise a field with which the change requester can indicate the nature of the impact.

3. A method of communicating and scheduling requests for computer system maintenance in accordance with claim 1 wherein the fields of the change request form comprise a field with which the change requester can indicate whether or not the request is for maintenance to hardware.

4. A method of communicating and scheduling requests for computer system maintenance in accordance with claim 1 wherein the fields of the change request form comprise a field with which the change requester can indicate whether or not the request is for emergency maintenance.

5. A method of communicating and scheduling requests for computer system maintenance in accordance with claim 1 wherein, with the field for indicating who will be impacted by the maintenance, the change requester can select from predefined groups of people, and wherein the transmitting the change request information to whoever was indicated as being impacted by the maintenance comprises transmitting the change request information to respective members of the selected predefined group.

6. A method of communicating and scheduling requests for computer system maintenance in accordance with claim 1 wherein providing the change request form comprises providing an Internet web form to the change requester via TCP/IP communications.

7. A method of communicating and scheduling requests for computer system maintenance in accordance with claim 1 and further comprising assigning a schedule number to the change request information and associating the change request information with the schedule number.

8. A method of communicating and scheduling requests for computer system maintenance in accordance with claim 7 wherein, with the administrator interface, the change administrator can change the status information to indicate whether the maintenance is approved or denied, the method further comprising receiving changed status information, and providing to a user the calendar with the changed status information.

9. A method of communicating and scheduling requests for computer system maintenance in accordance with claim 1 and further comprising providing to the change administrator an administrator interface with which the change administrator can make changes to the status information.

10. A method of communicating and scheduling maintenance requests, the method comprising steps of:

providing to a maintenance requester a maintenance request form having fields with which the maintenance requester can provide information about a maintenance request, including fields identifying the maintenance requester, and a proposed date when maintenance will take place;

receiving maintenance request information that the maintenance requester provided using the maintenance request form;

storing the maintenance request information in a database;

providing to a user a calendar having boxes corresponding to days of a month, showing the maintenance request in a box corresponding to the maintenance requester's proposed date when the maintenance will take place, and showing status information associated with the maintenance request indicating whether the maintenance request has been approved, denied, or is pending an approval decision; and providing to the maintenance administrator an administrator interface with which the administrator can make changes to the status information associated with the maintenance request.

11. A method of communicating and scheduling maintenance requests in accordance with claim 10 and further comprising, after providing to the maintenance administrator the administrator interface, receiving changed status information, and providing to a user the calendar, with the calendar showing the changed status information.

12. A method of communicating and scheduling maintenance requests in accordance with claim 10 and further comprising, after providing to the maintenance administrator the administrator interface, receiving changed status information, and providing to a user the calendar with the changed status information indicated with a change of color.

13. A method of communicating and scheduling maintenance requests in accordance with claim 10 and further comprising assigning a schedule number to the maintenance requester information and associating the maintenance requester information with the schedule number.

14. A method of communicating and scheduling maintenance requests in accordance with claim 13 wherein showing the maintenance request in a box comprises showing the schedule number in the box, and wherein the method further comprises, after providing to the maintenance administrator the administrator interface, receiving changed status information, and providing to a user the calendar with the changed status information indicated with a change of color of the schedule number.

15. A method of communicating and scheduling maintenance requests in accordance with claim 13 wherein showing the maintenance request in a box comprises showing the schedule number in the box, and wherein the method further comprises, after providing to the maintenance administrator the administrator interface, receiving changed status information, and providing to a user the calendar with the changed status information indicated with a change of color of the schedule number and, if the changed status information includes a change in the proposed date when the maintenance will take place, with the schedule number moved to a different box.

16. An apparatus comprising:

a server having a memory, and a database defined in the memory; and a plurality of user's client machines configured to selectively communicate with the server, one of the user's client machines defining a change administrator's client machine, one of the user's client machines defining a change requester's client machine, the server being configured to provide to the change requester's client machine a change request form having fields with which a change requester can provide information indicating an e-mail address for the change requester, a maintenance request type, a proposed date and time when maintenance will take place, an estimated duration for the maintenance, who will be impacted by the maintenance, the nature of the impact, and the impact if the maintenance is not performed; the server being configured to receive from the change requester's client machine change request information from the change requester in response to the change requester providing information for at least some of the fields of the change request form; the server being configured to store the change request information in the database, to provide the change request information to the change administrator's client machine, and to transmit the change request information to user's client machines associated with whoever was indicated as being impacted by the maintenance; and the server being configured to provide to a user's client machine a calendar displaying indicia associated with the change request information, as well as status information associated with the change request information.

17. An apparatus in accordance with claim 16 wherein the fields of the change request form further comprise a field with which the change requester can indicate a name of a requesting group.

18. An apparatus in accordance with claim 16 wherein, with the change request form, the change requester can indicate whether or not the request is for maintenance to hardware.

19. An apparatus in accordance with claim 16 wherein, with the field for indicating who will be impacted by the maintenance, the change requester can select from predefined groups of people, and wherein, to transmit the change request information to whoever was indicated as being impacted by the maintenance, the server transmits the change request information to respective members of the selected group.

20. An apparatus in accordance with claim 16 wherein the change request form comprises an Internet web form, and wherein the server is configured to provide the change request form via TCP/IP communications.

21. An apparatus in accordance with claim 16 wherein the server is further configured to assign a schedule number to the change request information and associate, in the database, the change request information with the schedule number.

22. An apparatus in accordance with claim 16 wherein the server is further configured to provide to the change administrator's client machine an administrator interface with which the administrator can make changes to the status information.

23. An apparatus in accordance with claim 22 wherein, with the administrator interface, the administrator can change the status information to indicate whether the maintenance is approved or denied, the server being further configured to receive changed status information, and provide to a user's client machine the calendar with the changed status information.

24. A program storage device readable by a server machine, the program storage device tangibly embodying a program of instructions executable by the server machine to cause the server machine to:

provide to a maintenance requester's client machine a maintenance request form having fields with which a maintenance requester can provide information about a maintenance request, including fields identifying the maintenance requester, and a proposed date when maintenance will take place;

receive maintenance request information that the maintenance requester provided using the request form;

store the maintenance request information in a database, and transmit the maintenance request information to a maintenance administrator's client machine;

provide to a user's client machine a calendar having boxes for days of a month, showing the maintenance request in a box corresponding to the maintenance requester's proposed date when the maintenance will take place, and showing status information associated with the maintenance request indicating whether the maintenance request has been approved, denied, or is pending an approval decision; and provide to an administrator's client machine an administrator interface with which the administrator can make changes to the status information for the maintenance request.

25. A program storage device in accordance with claim 24 and further comprising, after providing to an administrator an administrator interface, receiving changed status information, and providing to a user the calendar with the changed status information.

26. A program storage device in accordance with claim 24 and further comprising, after providing to an administrator an administrator interface, receiving changed status information, and providing to a user the calendar with the changed status information indicated with a change of color.

27. A program storage device in accordance with claim 24 and further comprising assigning a schedule number to the maintenance request information and associating the maintenance request information with the schedule number.

28. A program storage device in accordance with claim 27 wherein showing the maintenance request in a box comprises showing the schedule number in the box, and wherein the program of instructions is further executable to, after providing to an administrator an administrator interface, receiving changed status information, and providing to a user the calendar with the changed status information indicated with a change of color of the schedule number.

29. A program storage device in accordance with claim 27 wherein showing the maintenance request in a box comprises showing the schedule number in the box, and wherein the program of instructions is further executable to, after providing to an administrator an administrator interface, receiving changed status information, and providing to a user the calendar with the changed status information indicated by a change of color of the schedule number and, if the changed status information includes a change in proposed date when the maintenance will take place, with the changed status information indicated by a change in the box within which the schedule number appears.

30. A method of communicating and scheduling requests for computer system maintenance, the method comprising:

providing to a change requester a change request form having fields with which the change requester can provide information indicating contact information for the change requester, the maintenance request type, a proposed date when the computer system maintenance will take place, and who will be impacted by the computer system maintenance;

receiving change request information from the change requester in response to the change requester providing information for at least some of the fields of the change request form;

storing the change request information in a database, transmitting the change request information to a change administrator, and transmitting the change request information to whoever was indicated as being impacted by the maintenance;

providing to a user a calendar displaying indicia associated with the change request information, as well as status information associated with the change request information;

providing to the change administrator an administrator interface with which the administrator can make changes to the status information associated with change request information; and after providing to the change administrator the administrator interface, receiving changed status information, and providing to a user the calendar with the calendar showing the changed status information.

31. A method of communicating and scheduling maintenance requests, the method comprising steps of:

providing to a maintenance requester a maintenance request form having fields with which the maintenance requester can provide information about a maintenance request, including fields identifying the maintenance requester, the maintenance request type, and a proposed date when maintenance will take place;

receiving maintenance request information that the maintenance requester provided using the maintenance request form;

storing the maintenance request information in a database;

providing to a user a calendar having boxes corresponding to days of a month, showing the maintenance request in a box corresponding to the maintenance requester's proposed date when the maintenance will take place, and showing status information associated with the maintenance request indicating whether the maintenance request has been approved, denied, or is pending an approval decision;

providing to the maintenance administrator an administrator interface with which the administrator can make changes to the status information associated with the maintenance request;

receiving changed status information from the maintenance administrator in response to the maintenance administrator providing changed status information on the administrator interface; and after providing to the maintenance administrator the administrator interface and receiving changed status information, providing to a user the calendar with the calendar showing the changed status information.

32. A method of communicating and scheduling maintenance requests in accordance with claim 31 wherein the changed status information is indicated with a change of color.

33. A method of communicating and scheduling maintenance requests in accordance with claim 31 and further comprising assigning a schedule number to the maintenance requester information and associating the maintenance requester information with the schedule number.

34. A method of communicating and scheduling maintenance requests in accordance with claim 33 wherein showing the maintenance request in a box comprises showing the schedule number in the box, and wherein the changed status information is indicated with a change of color of the schedule number.

35. A method of communicating and scheduling maintenance requests in accordance with claim 33 wherein showing the maintenance request in a box comprises showing the schedule number in the box, and wherein the changed status information is indicated with a change of color of the schedule number and, if the changed status information includes a change in the proposed date when the maintenance will take place, the schedule number is moved to a different box.

36. An apparatus comprising:
a server having a memory, and a database defined in the memory; and
a plurality of user's client machines configured to selectively communicate with the server, one of the user's client machines defining a change administrator's client machine, one of the users client machines defining a change requester's client machine,
the server being configured to provide to the change requester's client machine a change request form having fields with which a change requester can provide information indicating an e-mail address for the change requester, a maintenance request type, a proposed date and time when maintenance will take place, an estimated duration for the maintenance, who will be impacted by the maintenance, the nature of the impact, and the impact if the maintenance is not performed;
the server being configured to receive from the change requester's client machine change request information from the change requester in response to the change requester providing information for at least some of the fields of the change request form;
the server being configured to store the change request information in the database, to provide the change request information to the change administrator's client machine, and to transmit the change request information to user's client machines associated with whoever was indicated as being impacted by the maintenance;
the server being configured to provide to a user's client machine a calendar displaying indicia associated with the change request information, as well as status information associated with the change request information;
wherein the server is further configured to provide to the change administrator's client machine an administrator interface with which the administrator can make changes to the status information, and wherein, with the administrator interface, the change administrator can change the status information to indicate whether the maintenance is approved or denied, and the server being further configured to receive changed status information and provide to a user's client machine the calendar with the changed status information.

37. A program storage device readable by a server-machine, the program storage device tangibly embodying a program of instructions executable by the server machine to cause the server machine to:
provide to a maintenance requester's client machine a maintenance request form having fields with which a maintenance requester can provide information about a maintenance request, including fields identifying the maintenance requester, a maintenance request type, and a proposed date when maintenance will take place;
receive maintenance request information that the maintenance requester provided using the request form;
store the maintenance request information in a database, and transmit the maintenance request information to a maintenance administrator's client machine;
provide to a user's client machine a calendar having boxes for days of a month, showing the maintenance request in a box corresponding to the maintenance requester's proposed date when the maintenance will take place, and showing status information associated with the maintenance request indicating whether the maintenance request has been approved, denied, or is pending an approval decision;
provide to an administrator's client machine an administrator interface with.which the administrator can make changes to the status information for the maintenance request; and
after providing to an administrator an administrator interface, receive changed status information and provide to a user the calendar with the changed status information.

38. A program storage device in accordance with claim 37 wherein the changed status information is indicated with a change of color.

39. A program storage device in accordance with claim 37 and further comprising assigning a schedule number to the maintenance request information and associating the maintenance request information with the schedule number.

40. A program storage device in accordance with claim 39 wherein showing the maintenance request in a box comprises showing the schedule number in the box, and wherein the program of instructions is further executable to provide to a user the calendar with the changed status information indicated with a change of color of the schedule number.

41. A program storage device in accordance with claim 39 wherein showing the maintenance request in a box comprises showing the schedule number in the box, and wherein the program of instructions is further executable to provide to a user the calendar with the changed status information indicated by a change of color of the schedule number and, if the changed status information includes a change in proposed date when the maintenance will take place, with the changed status information indicated by a change in the box within which the schedule number appears.

* * * * *